United States Patent [19]

Komatsu

[11] Patent Number: 5,019,763
[45] Date of Patent: May 28, 1991

[54] LEARNING CONTROL METHOD IN NUMERICAL CONTROL MACHINE TOOL

[75] Inventor: Toshiteru Komatsu, Aichi, Japan
[73] Assignee: Kabushiki Kaisha Okuma Tekkosho, Aichi, Japan
[21] Appl. No.: 385,416
[22] Filed: Jul. 26, 1989
[30] Foreign Application Priority Data
  Jul. 29, 1988 [JP] Japan .................. 63-190174
[51] Int. Cl.$^5$ .................................................. G05B 19/25
[52] U.S. Cl. ............................ 318/571; 318/573; 318/39; 364/474.15; 364/474.3
[58] Field of Search ..................... 318/571, 39, 573; 364/474.15, 474.3

[56] References Cited

U.S. PATENT DOCUMENTS 4,879,660  11/1989  Asakura et al. ............ 318/571 X

Primary Examiner—William M. Shoop, Jr.
Assistant Examiner—Saul M. Bergmann
Attorney, Agent, or Firm—Wenderoth, Lind & Ponack

[57] ABSTRACT

For controlling the rotation angle of a main shaft of a numerical control machine tool in synchronization with the position of a feed shaft, the learning control method according to the present invention comprises steps of reading the positional command value of the feed shaft corresponding to the detected value of the current revolutional angle of said main shaft out of the table which stores in advance the positional instruction values corresponding to the angle equivalent to one rotation of the shaft, subtracting the detected value of the current position of the feed shaft from the read out positional value to obtain the positional deviation table of the shaft, renewing the correction value table of the positional deviation values of the shaft which are stored in advance by using afore-mentioned deviation table, and suspending the renewal operation of the correction table of the positional deviation when the difference between the positional deviation table which has been added with the correction value table before the renewal and the positional deviation table which has been added with the correction value table after the renewal becomes less than a predetermined numerical value.

18 Claims, 4 Drawing Sheets

LEARNING CONTROL METHOD IN NUMERICAL CONTROL MACHINE TOOL

BACKGROUND OF THE INVENTION

The present invention relates to a learning control method for synchronously controlling at a high precision the rotational angle of a main shaft (spindle) and the position of a feed shaft in an NC (numerical control) machine tool.

When the rotational angle of the main shaft is controlled for machining in synchronization with the position of the feed shaft by detecting the rotational angle of the main shaft of an NC lathe or the like with a pulse generator mounted on the main shaft, and by outputting the value designating the position of the feed shaft according to the pulse from the main shaft pulse generator, it is necessary to enhance the function of a servo system of the feed shaft in order to increase the machining precision. For instance, in order to reduce a follow-up error of the feed shaft which is controlled in position, it is necessary to increase a position loop gain of the feed shaft system. However, if the position loop gain is increased excessively, the control becomes unstable. There was heretofore a limitation in the reduction of the follow-up error on the feed shaft.

There has been proposed a method which takes not of the fact that the value designating the position of the feed shaft tends to be repeated cyclically during the above mentioned synchronized control, and uses the response in repetitive operations to enhance the follow-up accuracy of the feed shaft system in a learning mode.

FIG. 1 is a block diagram showing an embodiment of the NC apparatus which realizes the aforementioned learning control method and which includes a basic servo system and a repetitive controller 50. The basic servo system forms a stable closed loop including, as shown in FIG. 2, a subtracter S which subtracts a current position $y(t)$ from a positional command value $r(t)$, and a transfer element $G_o$ which positions the shaft at the current position $y(t)$ by using the positional deviation value $\epsilon(t)$ from the subtracter S.

As shown in the block diagram shown in FIG. 1, the system includes a subtracter S which subtracts the current position $y(t)$ from the positional command value $r(t)$, an adder A1 which adds a corrected value $c(t)$ obtained from a repetitive controller to the positional deviation value $\epsilon(t)$ obtained from the subtracter S, and a transfer element $G_o$ which commands the current position $y(t)$ according to the corrected positional deviation value obtained from the adder A1. The repetitive controller 50 is composed of a positive feedback loop including an adder A2 which adds a deviation compensating value to the positional deviation $\epsilon(t)$ from the subtracter S, a deviation compensator $Fe^{-sL}$ including a filter $F(s)$ which limits the band zone and a dead time element $e^{-sL}$ of a length equal to the repetition cycle L of the positional command value $r(t)$, and a dynamic characteristic compensator $Gx(s)$ which outputs a corrected value $c(t)$ to the adder A1 based on the deviation compensating value obtained from the deviation compensator $Fe^{-sL}$ for stabilizing the control system and improving the characteristics. Refer to "Inoue et al.: High Precision Control in Repetitive Operation of Proton Synchrotron Electromagnetic Power Source. Proceedings of Denki-gakkai C-100.7 (1980), p. 234; Inoue et al.: High Precision Control of Playback-servo System. Proceedings of Denki-gakkai C-101.4 (1981), p. 89; Komata et al.: Extension of Repetitive Control to Multivariable Systems. Proceedings of Keisoku Jido-Seigyo Gakkai, Vol. 20, No. 9 (September, 1984); Sinnaka: Repetitive Control for Cyclic Time Change System. Proceedings of Denki-gakkai C-106.10. (1986), p. 209."

This type of NC apparatus is used in practive, for instance, for cutting non-circular configurations. Refer to "Higuchi et al.: Study on Oil Pressure Servo. Proceedings of Spring Session of Seiki-gakkai 1983, p. 875; Higuchi et al.: Study on Non-circular Configuration Cutting. Proceeding of Autumn Session of Seiki-gakkai 1984, p. 305; Higuchi et al.; Study on Non-circular Configuration Cutting. Proceedings of Autumn Session of Seiki-gakkai 1984, p. 307; Higuchi et al.: Study on Non-circular Configuration Cutting. Proceedings of Spring Session of Seiki-gakkai 1985, p. 27."

However, the aforementioned learning control methods have the following defects as discussed below in paragraphs (1) to (3).

(1) The follow-up accuracy is theoretically increased by repeating learning operations (as shown in FIG. 3 with a solid line). But in practice, the follow-up accuracy sometimes deteriorates after it is improved once (as shown with a broken line in FIG. 3). When the follow-up accuracy deteriorates, the learning process may be suspended by a command using an absolute value of the follow-up accuracy. But as the absolute value of the follow-up accuracy differs depending on the shape of the positional path designated for the feed shaft, it is impossible to command the suspension of the above learning step.

(2) If the learning for the designated path is performed at the same time as machining a work, the cycle time of the machining process inevitably increases.

(3) Since the dynamic characteristic compensator of the repetitive controller which is used for the learning control differs depending on each NC machine tool, the effect of the learning control varies widely.

SUMMARY OF THE INVENTION

The present invention was conceived to eliminate the above-mentioned defects encountered in the prior art, and aims at providing a learning control method which prevents deterioration of a follow-up accuracy and a redundancy of cycle times in machining during the synchronized control so that all types of NC machine tools can achieve the effects of learning control to the fullest extent.

The present invention, more particularly, relates to a learning control method which can precisely control the rotational angle of a main shaft of an NC machine tool in synchronization with a position of a feed shaft thereof. The method includes the steps of reading a command value for a position of the feed shaft which corresponds to the detected value of the current rotational angle of the main shaft from a command value table of feed shaft positions corresponding to the angles of one rotation of the main shaft which are stored in advance, obtaining a positional deviation table by subtracting the detected current position value of the feed shaft from the read out position command value thereof, renewing the correction table of the positional deviation of the feed shaft in the memory using the positional deviation table of the feed shaft, and completing the renewal operation of the correction value table when the difference between the positional deviation table which has been added with the corrected value table of the positional deviation before renewal and that after the renewal becomes less than a predetermined value.

PREFERRED EMBODIMENT OF THE INVENTION

A learning control method for an NC machine tool according to the present invention detects the improvement effect achieved by the learning control, suspends the operation of the repetitive controller automatically when the value becomes less than a designated parameter value or the effect has passed the optimal improvement point, and continues to use the corrected value obtained at that time point as the optimal value. The present invention method file-controls the corrected values and the positional command values obtained by the learning control in combination, and controls positions by the file thereafter. Therefore, if a learning control is only performed prior to machining of a work, the machining can easily be performed in practice with the data in the file. The characteristics of the dynamic characteristic compensator is made variable by software so that the process method may be modified by setting various parameters or the process per se may be switched from valid to invalid and vice versa.

Figure 1:
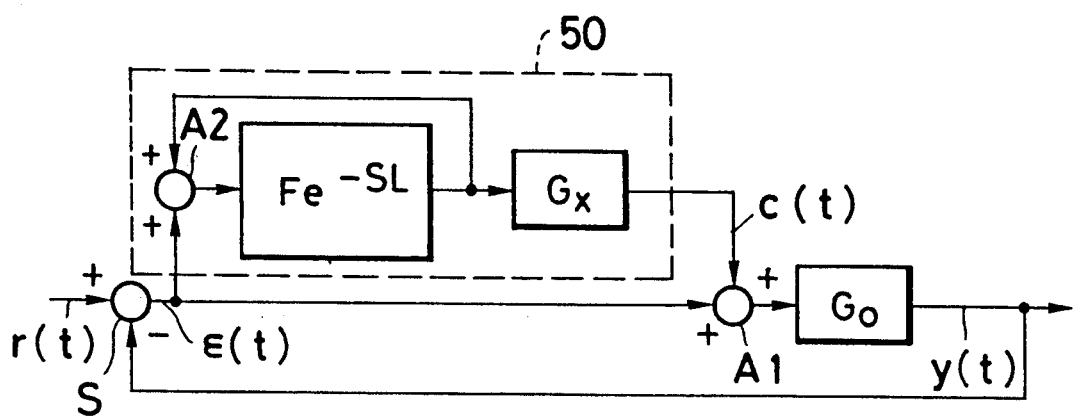
FIG. 1 is a block diagram showing an embodiment of a generally known NC apparatus which has a repetitive controller added to a basic servo system.
Figure 2:
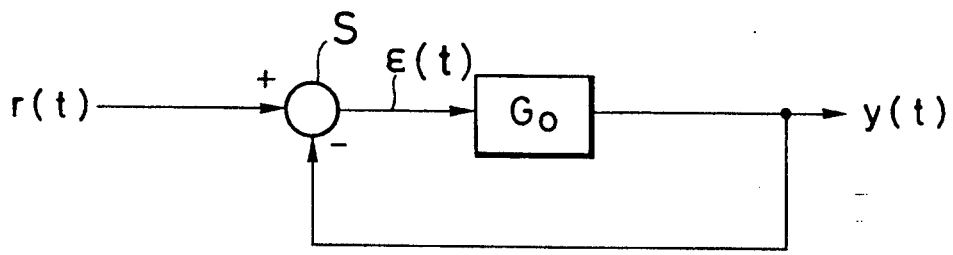
FIG. 2 is a controlling block diagram showing an embodiment of the basic servo system.
Figure 3:
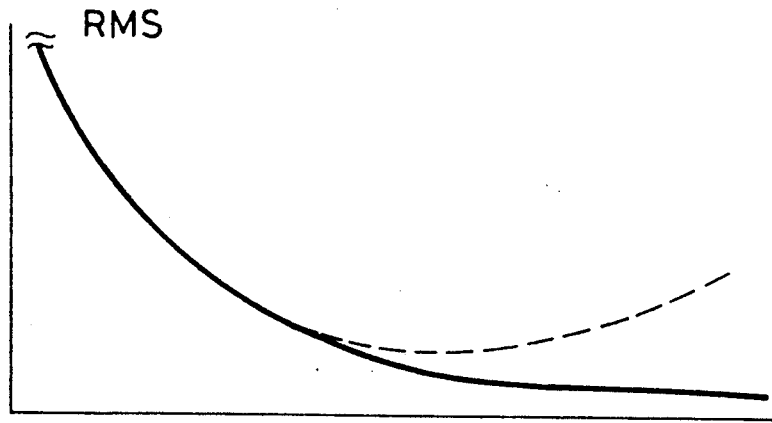
FIG. 3 is a graph showing the improvement made by a repetitive controller wherein the number of learning operations of the repetitive controller is plotted on the horizontal axis and mean square of positional deviation value on the vertical axis.

The learning control method according to the present invention monitors the improvement effects during the learning control, and suspends the learning operation or the operation (renewal of the corrected value) of the repetitive controller before follow-up accuracy deteriorates. When the formulas (1) and (2) below hold or the differential coefficient of the curve in FIG. 3 becomes less than the parameter value $p_o$, the operation of the repetitive controller is suspended, wherein the number of the repetitions of the controller (or the number of learning operations) is represented by n, and the positional deviation with respect to the rotational angle $\theta$ of the main shaft is represented by $E_n(\theta)(n=1, 2, \ldots)$.

$$\Delta E_n(\theta) = E_n(\theta) - E_{n-1}(\theta) \tag{1}$$

$$p_o \geq [\Delta E_n(\theta)]_{RMS} \tag{2}$$

(Provided that $[\Delta E_n(\theta)]_{RMS}$ represents the value of the square root of the mean square of $E_n(\theta)$.)

The above formula (2) may be either formula (3) or (4).

$$p_o \geq [\Delta E_n(\theta)]_{peak} \tag{3}$$

(Provided that $[\Delta E_n(\theta)]_{peak}$ represents the maximum value of $|\Delta E_n(\theta)|$.)

$$p_o \geq [\Delta E_n(\theta)]_{ave.} \tag{4}$$

(Provided that $[\Delta E_n(\theta)]_{ave.}$ represents the simple mean value of $|\Delta E_n(\theta)|$.)

In practice, if it is assumed that the number of pulses for one rotation of the main shaft generated from the main shaft pulse generator is represented as k, the above formula (2) may be expressed by the following formula (5).

$$p_o \geq \sqrt{\frac{\Delta E_n(0)^2 + \Delta E_n(1)^2 + \ldots + \Delta E_n(k-1)^2}{k}} \tag{5}$$

Similarly, the above formulas (3) and (4) may be expressed by the following formulas (6) and (7), respectively.

$$p_o \geq |\Delta E_n(q)| \tag{6}$$

(Provided $0 \geq q \geq k-1$, and $|\Delta E_n(q)|$ represent the maximum value of the absolute value of the positional deviation corresponding to the angle of the nth controller repetition.)

$$p_o \geq \frac{|\Delta E_n(0)| + |\Delta E_n(1)| + \ldots + |\Delta E_n(k-1)|}{k} \tag{7}$$

Figure 4:
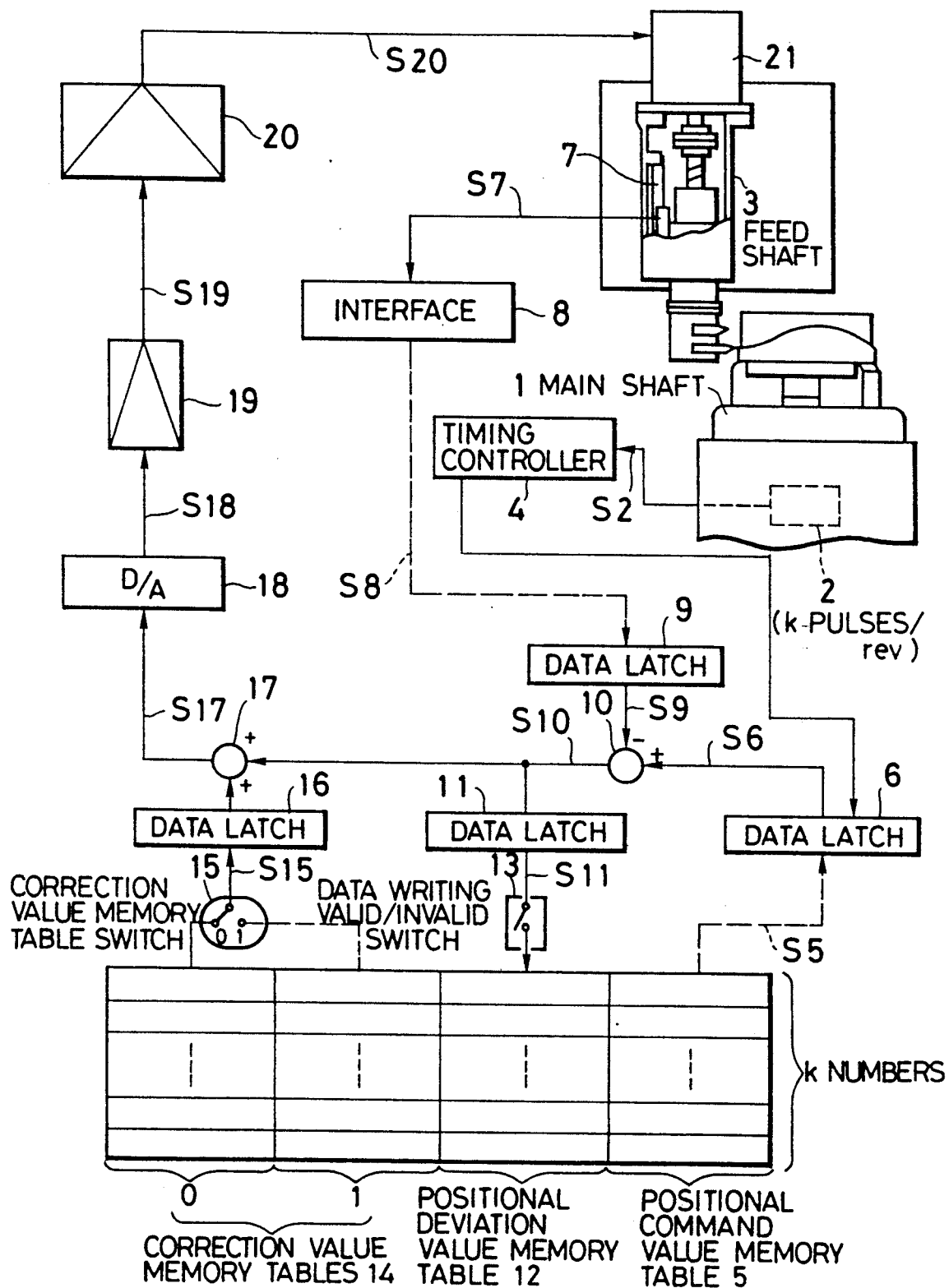
FIG. 4 is a block diagram showing an embodiment of an NC apparatus which realizes the learning control method for an NC machine tool according to the present invention.

FIG. 4 is a block diagram showing an NC apparatus which embodies the present invention learning control method to which the above formula (4) is applied. The apparatus includes a timing controller 4 which sets the timing S4 for the rotational angle of a main shaft 1 and the position of a feed shaft 3 with the pulses S2 generated from a main shaft pulse generator 2 contained within the main shaft 1 of an NC machine tool, a data latch 6 which reads out the positional command values S5 from a positional command value memory table 5 based on the timing S4 generated from the timing controller 4, an interface 8 for positional detection which sets the positional detection value S8 by processing the signals S7 from a position detector 7 contained within the feed shaft 3, a data latch 9 which reads out the positional detection value S8 from the interface 8 for positional detection and holds the same, and a subtracter 10 which subtracts the positional detection value S9 from the data latch 9 from the positional command value S6 from the data latch 6. Further, the apparatus includes a data latch 11 which reads out the positional deviation value S10 from the subtracter 10, a data writing valid/invalid switch 13 which determines whether or not the positional deviation value from the data latch 11 is written in the positional deviation value memory table 12, a correction value memory table switch 15 which selects the data differentiating the correction memory tables 14 of the same capacity with "0, 1", a data latch 16 which reads out the correction value S15 from the correction value memory tables 14 and holds the same, an adder 17 which adds the correction value S16 from the data latch 16 and the positional deviation S10 from the subtracter 10, a D/A converter 18 which converts the corrected positional deviation value S17 from the adder 17 into analog signals, an analog amplifier 19 which amplifies the analog signals S18 from the D/A converter 18, and a servo amplifier 20 which amplifies the amplified analog signals S19 from the analog amplifier 19 and drives a servomotor 21 with the amplified analog signals S20.

The data writing valid/invalid switch 13 and the correction value memory table switch 15 are switched in synchronization with the marker pulses generated from the main shaft pulse generator 2 in a manner to secure the positional deviation value and corrected value for one rotation of the main shaft. The aforementioned repetitive controller includes the positional deviation value memory table 12, correction value memory tables 14, data writing valid/invalid switch 13 and correction value memory table switch 15.

The operation of the apparatus with the above-mentioned structure will now be described. The apparatus is constructed with hardware which allows high speed responses as the operation in units are synchronized with the pulse signals of A and B phases and a marker phase generated from the main shaft pulse generator 2. The operation of the repetitive controller and the dynamic characteristic compensator is conducted by the NC system software. More particularly, when the repetitive controller is not in operation, the data writing valid/invalid switch 13 is invalidated and the correction value memory table switch 15 is switched to the side of "0" to make all the contents of the memory in the table "0".

When the learning control is performed, the data writing valid/invalid switch 13 is turned valid. As the data writing valid/invalid switch 13 is not synchronized with the main shaft pulse generator 2, the data writing valid/invalid switch 13 is turned invalid only after the timing controller 4 detects the marker pulse of the main shaft pulse generator 2, turns the data writing valid/invalid switch 13 valid to write in the positional deviation value in the positional deviation value memory table 12, and detects the marker pulse again. Therefore, their positional deviation value table of the feed shaft 3 which is equivalent to one rotation of the main shaft 1 is secured with the hardware. The NC software detects the state of the data writing valid/invalid switch 13, and if it detects it to be invalid, it judges that the positional deviation value has been written in, and transfers the positional deviation value table for one rotation of the main shaft into a work memory region on the NC software.

Figure 5:
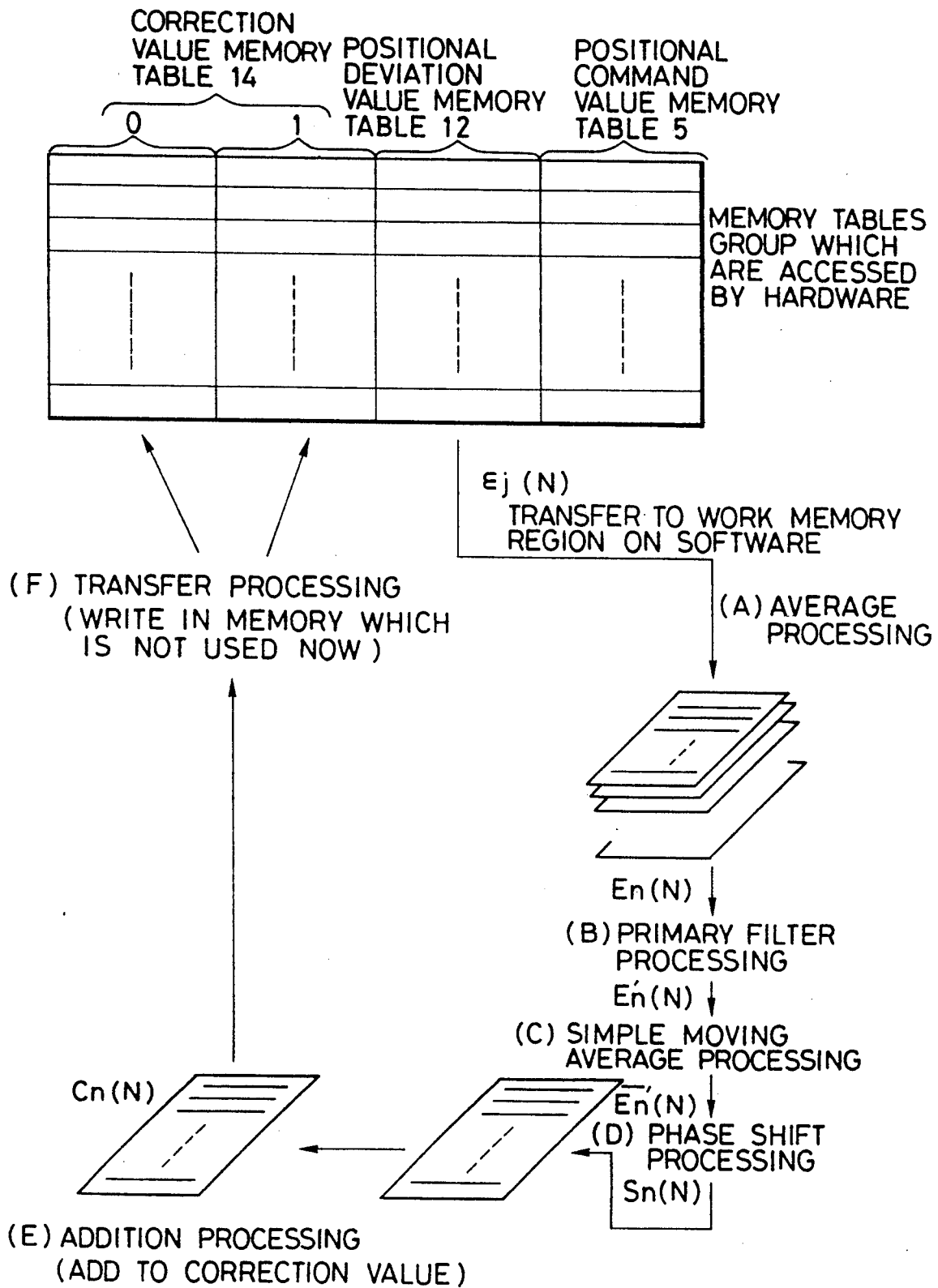
FIG. 5 is a flow chart explaining the process of the learning control with memory tables.

The learning control processing will now be described referring to the flow chart shown in FIG. 5.

(A) Average Processing

By using the positional command value and the initial correction value (usually they are all "0"), the positional deviation value written in the positional deviation value memory table 12 are designated as $\epsilon_j(N)$. It is assumed that the relations hold as $0 \geq N \geq k-1$, $j = 1, 2, 3, \ldots$, and k (pulses/rev.) denotes the number of pulses generated by the main shaft pulse generator on one rotation of the main shaft, and j (time) the number of times it is written in the positional deviation value memory table 12.

A simple moving average is calculated by taking the positional deviation values of the number of times designated by the parameter $p_1$ (times). After the average processing, the value $E_n(N)$ is expressed by the following equation.

$$E_n(N) = \frac{\epsilon_j(N) + \epsilon_{j+1}(N) + \ldots \epsilon_{j+p1}(N)}{p_1} \quad (8)$$

wherein $n \geq j$, $p_1 = 2, 3, 4, \ldots$

When this processing is invalidated, it corresponds to the case where $p_1 = 1$ in the above formula (8), and will be expressed by the following equation (9).

$$\bar{E}_n(N) = \epsilon_j(N) \quad (9)$$

(B) Primary Filter Processing

If it is assumed that the input at this filter is denoted as $E_n(N)$ and the output thereof as $E'_n(N)$, the relation holds as below.

$$E'_n(N+1) = (1-p_2) \times E_n(N) + p_2 E'_n(N) \quad (10)$$

(Provided, when $N = 0, 1, 2, \ldots, k-1$, $N = 0$, $E'_n(0) = E_n(0)$, and $p_2$ denotes a parameter for setting the cut-off frequency of the primary filter.)

In the equation (10), when $N = k-1$, the relation $E'_n(N+1) = E'_n(k)$ holds, but since this exceeds the range of $0 \geq N \geq k-1$, it is processed as $E'_n(k) \rightarrow E'_n(0)$. In other words, data are used cyclicly.

When this processing is invalidated, the above equation (10) is substituted with the following equation (11).

$$E'_n(N) = E_n(N) \quad (11)$$

(C) Simple Moving Average Processing

If it is assumed that the input of this processing is denoted as $E'_n(N)$ and the output thereof $\bar{E}'_n(N)$, it is expressed with the following equation (12). (This processing differs from the above average processing (A) in that the processing is conducted for the data equivalent to one rotation of the main shaft.)

$$\bar{E}_n(N) = \frac{1}{2p_3 + 1} \sum_{j=N-p_3}^{N+p_3} E_n(j_o) \quad (12)$$

(Provided $p_3$ denotes the number of points in the simple moving average processing set with parameters.)

In the above equation (12), if the relation $j_o < 0$ holds, the processing is conducted as $j_o \rightarrow j_o + k$, and when $j_o > k - 1$, it is conducted as $j_o \rightarrow j_o - k$ using the data cyclicly.

When this processing is invalidated, the equation (12) is substituted with the following equation (13).

$$\bar{E}_n(N) = E'_n(N) \quad (13)$$

(D) Phase Shift Processing

The above data of $\bar{E}'_n(N)$ is shifted with the parameter $p_4$ set, the equation below is expressed as relation (14).

$$S_n(N) = \bar{E}'_n(N - p_4) \quad (14)$$

(Provided $p_4$ is a natural number $0 \leq p_4 \leq k-1$.)

When $N - p_4 < 0$ in the equation (14), the processing is conducted as $N \rightarrow N - p_4 + k$ using the data cyclicly.

If this processing is invalidated, the equation (14) is substituted with the below equation (15).

$$S_n(N) = E'_n(N) \tag{15}$$

The above mentioned processings (A) through (D) can be validated/invalidated separately and independently, and easily changed with the parameters. Accordingly, the values of optimal parameters can be determined for the NC machine tool in practice. This method can deal resiliently with fluctuation of the learning control parameters otherwise caused by the difference in type numbers of machines in an NC system.

(E) Addition Processing

This processing sets the correction values which are to be transferred to the correction value memory tables 14. The number of the correction value memory tables 14 which are to be transferred is controlled to become the memory table number which is turned off from the operation by the correction value memory table switch 15. If it is assumed that the output $S_n(N)$ of the phase shift processing is an input of an addition processing while the output thereof is denoted as $C_n(N)$, the relation holds as below.

$$C_n(N) = C_{n-1}(N) + S_n(N) \tag{16}$$

The relation $C_0(N) = 0$ holds usually, but it is not necessarily "0".

(F) Transfer Processing

In order to transfer the data table obtained by the above equation (15) to the correction value memory table 14 of the number not used during the synchronized control, the correction value memory table switch 15 is switched. (Switching is performed in synchronization with the marker pulse of the main shaft pulse generator.)

The above operation is repeated until the formula (4) is established.

Figure 6:
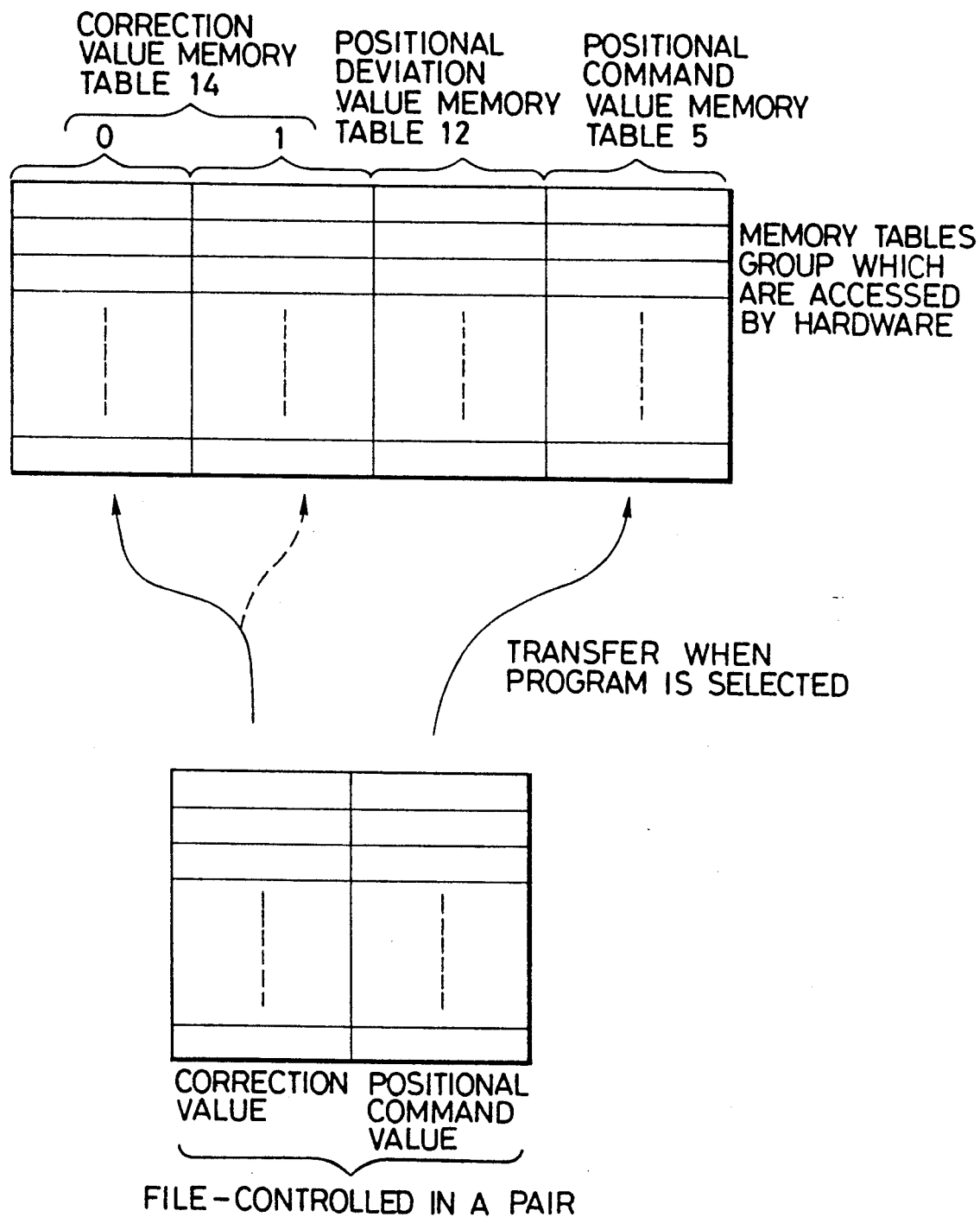
FIG. 6 is a view showing the structure of a shape data file which is used for controlling the rotational angle of the main shaft in synchronization with the position of the feed shaft and the destination of data transfer when a program is selected.

When the feed shaft and the main shaft are synchronously controlled, a shape data file having the positional command value and the correction value (usually "0" initially) set in a pair by the designation of the user is selected from the program (Refer to FIG. 6). This causes the positional command value and the correction value within the shape data file to be transferred to the positional command value memory table 5 and the correction value memory tables (either the number "0" or the number "1") 14 in each of the memory tables to be used for the positional control of the feed shaft. If the shaft is synchronously controlled with the main shaft as it is, since all the correction values are "0", they can not be corrected at all.

The learning control is then performed. (In this embodiment, M code is used). Upon completion, the correction values are written in the shape data file either manually or automatically. When this shape data file is selected thereafter, the positional command value and the correction value are transferred to each of the memory tables 5 and 14 to thereby enable actual cutting under the state that the follow-up accuracy is improved by the learning control.

According to the present invention learning control method for an NC machine tool, since the operation of the repetitive controller is suspended before the control accuracy becomes deteriorated after it has been improved once by the learning control, the accuracy will never become lowered again. Further, since the difference before and after reloading the correction values is used as an improvement even when the absolute values of the control accuracy differ depending on the positional path inputted on the feed shaft, and since the operation of the repetitive controller is suspended when the improvement effect decreases, the optimal improvement for each of the input positional path can be achieved. Moreover, since the optimal improvement effect is detected automatically during learning, deterioration of the follow-up accuracy can be prevented even if the improvement effect is strictly set with parameters. Since the shape data file comprises the positional command values and the correction values optimal to the command values, if the correction values are obtained in advance by the learning control, when a work is machined by the NC machine tool in practice, the deterioration in cycle time can be reduced zero. Since the structure and the processing contents of the repetitive controller used for the learning control are set with parameters in software, the difference in type or number of the applicable NC machine tools can be easily adjusted to thereby achieve a reduction in learning time as well as an increase in absolute values of the follow-up accuracy.

What is claimed is:

1. A learning control method for a numerical control machine tool which synchronously controls a rotational angle of a main shaft and a position of a feed shaft, said method comprising the steps of:
   (a) loading positional command values into a first data table, the positional command values being indicative of a desired position of the feed shaft relative to various rotational angles of the main shaft;
   (b) loading correction values into a second data table;
   (c) periodically detecting a position of the feed shaft at predetermined rotational angles of the main shaft to obtain actual positional values;
   (d) subtracting one of the positional command values and the actual positional values from the other of the positional command values and the actual positional values to obtain positional deviation values;
   (e) processing the positional deviation values in a predetermined manner to obtain processed positional deviation values;
   (f) adding the correction values to the processed positional deviation values to obtain new correction values;
   (g) loading the new correction values into the first data table;
   (h) repeating steps (c) through (g), which together constitute a correction value renewal cycle, until a deviation difference between the positional deviation values of an Nth correction value renewal cycle and the positional deviation values of an (N+1)th correction value renewal cycle decreases to less than a predetermined parameter value, N being a positive integer; and,
   (i) controlling the position of the feed shaft during operation of the machine tool according to the sum of the positional deviation values and the new correction values.

2. A learning control method as recited in claim 1, further comprising the step of proceeding to step (i) if the deviation difference increases from one correction value renewal cycle to a next correction value renewal cycle.

3. A learning control method as recited in claim 1, further comprising providing the first data table in the form of third and fourth data tables, wherein the third data contains correction values which are used during control of the position of the feed shaft, and the fourth data table contains new correction values which are loaded therein during a correction value renewal cycle.

4. A learning control method as recited in claim 2, further comprising providing the first data table in the form of third and fourth data tables, wherein the third data contains correction values which are used during control of the position of the feed shaft, and the fourth data table contains new correction values which are loaded therein during a correction value renewal cycle.

5. A learning control method as recited in claim 1, said processing step (e) comprising the steps of:
  calculating average values of the positional deviation values to obtain average positional deviation values;
  low-pass filter processing the average positional deviation values at a predetermined cut-off frequency to obtain filtered average positional deviation values;
  simple moving average processing the filtered average positional deviation values according to a predetermined point number and weight to obtain simple moving average values; and,
  phase shifting the simple moving average values to obtain the processed positional deviation values.

6. A learning control method as recited in claim 1, further comprising terminating the repeating step (h) of the correction value renewal cycle when $p_o \geq [-\Delta E_n(\theta)]_{RMS}$,
  wherein $p_o$ is a predetermined parameter value,
  wherein $E_n(\theta)$ is a positional deviation value at rotation angle $\theta$ of the main shaft during correction value renewal cycle n, n being a positive integer, and,
  wherein $[\Delta E_n(\theta)]_{RMS}$ is equal to $$\frac{[E_n(\theta_1) - E_{n-1}(\theta_1)]^2 + [E_n(\theta_2) - E_{n-1}(\theta_2)]^2 + \ldots + [E_n(\theta_x) - E_{n-1}(\theta_x)]^2}{X}$$

wherein x is an integer representing a number of times in a single rotation of the main shaft that a positional deviation value is calculated.

7. A learning control method as recited in claim 6, wherein said $[\Delta E_n(\theta)]_{RMS}$ is a maximum value $\Delta E_n(\theta)_{peak}$ of $|E_n(\theta)|$.

8. A learning control method as recited in claim 6, wherein said $[\Delta E_n(\theta)]_{RMS}$ is $[\Delta E_n(\theta)]_{ave}$ which is a simple average of $|\Delta E_n(\theta)|$.

9. A learning control method as recited in claim 5, said low-pass filter processing step for carrying out the following equation:

$$E'_n(N+1) = (i-p_2) \times (E_n(N) + p_2 E'_n(N),$$

wherein $E_n(N)$ is the average positional deviation value at rotational position N of the main shaft during correction value renewal cycle n,
  wherein $E'_n(N)$ is the filtered average positional deviation value at rotational position N of the main shaft during correction value renewal cycle n, and,
  wherein $p_2$ is a parameter value for setting the cut-off frequency.

10. A learning control method as recited in claim 5, said simple moving average processing step for carrying out the following equation:

$$\bar{E}_n(N) = \frac{1}{2p_3 + 1} \sum_{J_o = N-p_3}^{N+p_3} E'_n(j_o)$$

wherein $E'_n(j_o)$ is the filtered average positional deviation value during correction value renewal cycle n,
  wherein $p_3$ is a parameter value of the predetermined point number, and
  wherein $\bar{E}'_n(N)$ is the simple moving average value during correction value renewal cycle n.

11. A learning control method as recited in claim 9, said simple moving average processing step for carrying out the following equation:

$$\bar{E}_n(N) = \frac{1}{2p_3 + 1} \sum_{J_o = N-p_3}^{N+p_3} E'_n(j_o)$$

wherein $E'_n(j_o)$ is the filtered average positional deviation value during correction value renewal cycle n,
  wherein $p_3$ is a parameter value of the predetermined point number, and
  wherein $\bar{E}'_n(N)$ is the simple moving average value during correction value renewal cycle n.

12. A learning control method as recited in claim 10, wherein when $j_o$ becomes less than 0, $j_o$ goes to $(j_o + k)$, and when $j_o$ becomes greater than $(k-1)$, $j_o$ goes to $(j_o - k)$, wherein k is an integer denoted the number of detected rotational positions of the main shaft during one rotation.

13. A learning control method as recited in claim 11, wherein when $j_o$ becomes less than 0, $j_o$ goes to $(j_o + k)$, and when $j_o$ becomes greater than $(k-1)$, $j_o$ goes to $(j_o - k)$, wherein k is an integer denoted the number of detected rotational positions of the main shaft during one rotation.

14. A learning control method as recited in claim 5, said phase shifting step for carrying out the following equation:

$$S_n(N) = \bar{E}'_n(N - p_4),$$

wherein $S_n(N)$ is the processed positional deviation value at rotational position N of the main shaft during correction value renewal cycle n,
  wherein $\bar{E}'_n(N - p_4)$ is the simple moving average value at rotational position $(N - p_4)$ of the main shaft during correction value renewal cycle n, and,
  wherein $p_4$ is a parameter value.

15. A learning control method as recited in claim 9, said phase shifting step for carrying out the following equation:

$$S_n(N) = \bar{E}'_n(N - p_4),$$

wherein $S_n(N)$ is the processed positional deviation value at rotational position N of the main shaft during correction value renewal cycle n,
  wherein $\bar{E}'_n(N - p_4)$ is the simple moving average value at rotational position $(N - p_4)$ of the main shaft during correction value renewal cycle n, and,
  wherein $p_4$ is a parameter value.

16. A learning control method as recited in claim 10, said phase shifting step for carrying out the following equation:

$$S_n(N) = \overline{E}'_n(N - p_4),$$

wherein $S_n(N)$ is the processed positional deviation value at rotational position N of the main shaft during correction value renewal cycle n, wherein $\overline{E}'_n(N - p_4)$ is the simple moving average value at rotational position $(N - p_4)$ of the main shaft during correction value renewal cycle n, and, wherein $p_4$ is a parameter value.

17. A learning control method as recited in claim 11, said phase shifting step for carrying out the following equation:

$$S_n(N) = \overline{E}'_n(N - p_4),$$

wherein $S_n(N)$ is the processed positional deviation value at rotational position N of the main shaft during correction value renewal cycle n, wherein $\overline{E}'_n(N - p_4)$ is the simple moving average value at rotational position $(N - p_4)$ of the main shaft during correction value renewal cycle n, and, wherein $p_4$ is a parameter value.

18. A learning control method as recited in claim 14, wherein when $(N - p_4)$ become less than 0, N goes to $(N - p_4 + k)$, wherein k is an integer denoting the number of detected rotational positions of the main shaft during one rotation.

* * * * *